US009395218B2

(12) United States Patent
Baker et al.

(10) Patent No.: US 9,395,218 B2
(45) Date of Patent: Jul. 19, 2016

(54) DUAL POINTER DISPLAY

(71) Applicants: Mark James Arthur Baker, Grays (GB); Dan Gullick, Chelmsford (GB); Kevin Langley Gallichan, London (GB)

(72) Inventors: Mark James Arthur Baker, Grays (GB); Dan Gullick, Chelmsford (GB); Kevin Langley Gallichan, London (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 204 days.

(21) Appl. No.: 14/226,514

(22) Filed: Mar. 26, 2014

(65) Prior Publication Data
US 2014/0290562 A1    Oct. 2, 2014

(30) Foreign Application Priority Data

Mar. 27, 2013    (GB) .................................. 1305606.4

(51) Int. Cl.
*G01D 13/26*    (2006.01)
*G01D 7/08*    (2006.01)
*G01D 11/28*    (2006.01)

(52) U.S. Cl.
CPC ................ *G01D 13/265* (2013.01); *G01D 7/08* (2013.01)

(58) Field of Classification Search
CPC ........ G12B 11/00; G12B 11/02; G12B 11/04; G01D 7/00; G01D 7/02; G01D 7/04; G01D 7/08; G01D 7/10; G01D 11/28; G01D 13/22; G01D 13/24; G01D 13/26; G01D 13/265; G01D 13/28
USPC ................ 116/286, 287, 288, 300, 301, 329, 116/DIG. 6, DIG. 36; 340/815.78, 815.86, 340/815.87, 815.88
See application file for complete search history.

(56) References Cited

U.S. PATENT DOCUMENTS

| 3,653,257 | A | * | 4/1972 | Brindley | G01L 3/02 116/301 |
| 4,170,132 | A | * | 10/1979 | Serley | G01D 7/04 73/170.02 |
| 4,380,043 | A | * | 4/1983 | Takamatsu | G01D 11/28 340/815.53 |
| 6,557,485 | B1 | * | 5/2003 | Sauter | G01D 7/04 116/284 |
| 6,666,101 | B1 | * | 12/2003 | Sauter | G01D 7/04 73/866.1 |
| 7,305,932 | B2 | * | 12/2007 | Hildebrand | G01D 7/04 116/288 |
| 8,534,218 | B2 | * | 9/2013 | Ewers | B60K 37/02 116/300 |
| 8,651,679 | B2 | * | 2/2014 | Shimane | G01D 7/08 116/286 |
| 2002/0108555 | A1 | | 8/2002 | Breinich et al. | |

FOREIGN PATENT DOCUMENTS

| CN | 202350820 U | | 7/2012 | |
| CN | 203629595 U | * | 6/2014 | ............... G01D 7/04 |
| DE | 3906721 A1 | * | 9/1990 | ............... G01D 7/04 |

(Continued)

*Primary Examiner* — R. A. Smith
(74) *Attorney, Agent, or Firm* — Dickinson Wright PLLC

(57) ABSTRACT

A pointer display with a first visible indication and a second visible indication, including a first pointer element, the first pointer element being rotatable around a first axis and comprising a first pointer arm and a first stem, the first stem extending in a first axis and the first pointer arm extending away from the first stem to facilitate the first visible indication; and a second pointer element, the second pointer element being rotatable around a second axis and comprising a second pointer arm and a second stem, the second stem extending a second axis and the second pointer arm extending away from the second stem to facilitate the second visible indication, and the first axis and the second axis being coincident with each other wherein the first pointer element and the second pointer element rotate around a common axis.

8 Claims, 1 Drawing Sheet

(56) References Cited

FOREIGN PATENT DOCUMENTS

| JP | 55016251 A | * | 2/1980 | ............... | G01D 7/00 |
| JP | 08136292 A | * | 5/1996 | ............... | G01D 7/04 |
| JP | 2000074701 A | * | 3/2000 | ............... | G01D 7/02 |
| JP | 2008302870 A | | 12/2008 | | |
| WO | WO 2006120515 A1 | * | 11/2006 | ............... | G01D 7/04 |

* cited by examiner

DUAL POINTER DISPLAY

CLAIM OF PRIORITY

This patent application claims priority to United Kingdom Patent Application No. 1305606.4, filed Mar. 27, 2013, entitled "Concentric Pointer Gear, which is incorporated herein by reference in its entirety.

BACKGROUND

Display units often incorporate pointer displays having a rotatable illuminated pointer arm which extends radially outwards from an axially extending rotatable shaft. The shaft is driven by a motor, which is normally concealed from view beneath a display area above which the pointer arm moves. Light is introduced into the base of the pointer arm and is transmitted along the length of the arm, which therefore acts as a light pipe. One common way in which the illumination is directed forwards to a viewer of the display unit is by a painted rear surface on the pointer arm. Along the length of the arm the painted rear surface scatters some light to the viewer.

One way of introducing light into the pointer arm is to use the pointer shaft also as a light pipe. A shaft, in this disclosure, may be replaced by a stem. The light pipe shaft can extend through the motor so that a source of illumination can introduce light into a rearmost end face of the light pipe shaft. The light pipe shaft then includes a mirror or light splitter to redirect at least some of the light from the shaft into the pointer arm.

Disclosed herein is a pointer display having two such illuminated pointer arms which rotate about a common axis. Such coaxial pointer displays are referred to herein as dual rotatable pointer displays.

An example of such a display unit is an automotive instrument is a clock which has two hands driven by concentric drive shafts. In many clocks, these shafts are geared together to obtain the correct ratio of elapsed hours and minutes. It can, however, be desirable if the pointer arms, here the two hands of the clock, are moved independently, each by its own control motor. Another example in the automotive field is a combined fuel gauge and temperature gauge with two independent pointers that share a common axis.

In automotive applications, it may not be economic or practical to use dual output motors having two concentric shafts, and such dual output motors may make it difficult or impossible to illuminate both pointer arms using a common light source.

One way of arranging such a dual rotatable pointer display such that both pointer arms are illuminated with a common light source is disclosed in patent document US 2002/0108555 A1. In this arrangement, there are two side-by-side motors behind the display area which separately drive two rotatable shafts, a first one of which of which is on the rotation axis and a second one of which is tubular and concentric with the rotation axis. The first shaft drives a first pointer arm and the second shaft drives a second pointer arm. Light is introduced into a rear end face of the axial first shaft, which includes a light splitter to redirect proportions of the light into both pointer arms.

Although this dual rotatable pointer display provides independent rotation for two illuminated pointer arms sharing a common light source, this arrangement is mechanically complex, requiring two separate motor units each of which includes a worm drive mechanism that drives a gear on a portion of the corresponding shaft.

SUMMARY

According to the aspects disclosed herein, there is provided a pointer display for providing a first visible indication and a second visible indication to a viewer of the pointer display, the pointer display comprising: a first pointer element, the first pointer element being rotatable about a first axis and comprising a first pointer arm and a first stem, the first stem extending in the direction of the first axis and the first pointer arm extending away from the first stem to provide said first visible indication; a second pointer element, the second pointer element being rotatable about a second axis and comprising a second pointer arm and a second stem, the second stem extending in the direction of the second axis and the second pointer arm extending away from the second stem to provide said second visible indication, and the first axis and the second axis being coincident with each other whereby the first pointer element and the second pointer element rotate about a common axis;

a first drive mechanism for driving the rotation of the first pointer element, the first drive mechanism comprising a first motor and a gear train, the gear train linking the first motor to the first shaft to drive the rotation of the first pointer element, and the gear train comprising an input gear and an output gear, the output gear being connected to the first shaft and the input gear providing power from the first motor to the output gear in order to rotate said connected output gear and the first shaft about the first axis;

a second drive mechanism for driving the rotation of the second pointer element, the second drive mechanism comprising a second motor, the second motor being linked to the second shaft to drive the rotation of the second pointer element;

an optical system for illuminating said pointer arms to said viewer, said optical system comprising a light source, a light pipe and a light splitter, the light pipe being configured to receive light from said light source and to convey said light to the light splitter, the light pipe being provided by the second shaft and the light splitter being configured to divide said light between the first pointer element and the second pointer element such that both the first pointer arm and the second pointer arm are illuminated by said light; wherein the output gear is supported by a bearing on the second shaft.

The first shaft is preferably supported by the second shaft by means of the intervening bearing. This simplifies the construction of the device, as fewer parts are in principle needed, as well as helping to ensure the alignment or concentricity of the first and second shafts.

The bearing may be a plain cylindrical bearing having a smooth cylindrical interface, however, in order to provide low friction and smooth, judder free movement of the first pointer arm, it is preferred if the bearing is a rolling-element bearing. Such bearings are sometimes referred to as a rolling bearing. This is a type of bearing which carries a load by placing a plurality of round elements between two bearing rings. Such a bearing may, of course, include one or more seals to protect the roller elements from environmental contamination in order to ensure continued smooth operation. The round elements may be cylinders, but in another example, the rolling-element bearing is a ball bearing comprising a plurality of balls between an inner race and an outer race. The inner race may be a radially outwards surface of the second shaft and the outer race may be a radially inner surface on the first shaft. The inner race may be stationary relative to the second shaft and the outer race may then rotate with the rotation of the connected output gear and the first shaft.

The second shaft preferably comprises a cylindrical main body which provides the light pipe. The inner race is then preferably affixed to the outer cylindrical surface of the light pipe. The main body of the of the second shaft may have a substantially cylindrical collar connected or fitted to the second shaft, this collar then providing the inner race for the ball bearing. This cylindrical main body may also provide the light splitter which may have a light extraction feature, for example a notch that extends circumferentially around a portion or all of the cylindrical main body.

The first pointer arm preferably has an external surface with an input face that faces towards this light extraction feature for receiving light scattered or reflected out of the second shaft by the light extraction feature.

The light pipe preferably has an external surface with an input face that faces towards the light source for receiving light emitted by the light source.

Once the light is introduced into each pointer arm, the light is transmitted along the length of the pointer arm. The person skilled in the art will appreciate that there are many known ways in which this light may then be redirected from within the pointer arm to provide a more visible indication to the viewer of the display, for example by means of a fluorescent dye or a light scattering material incorporated into the material of the arm, or by means of a painted or textured rear surface along the length of the pointer arms.

BRIEF DESCRIPTION OF THE DRAWINGS

The invention will now be further described, by way of example only, and with reference to the accompanying drawings, in which.

DETAILED DESCRIPTION

Figures 1, 2, 3:
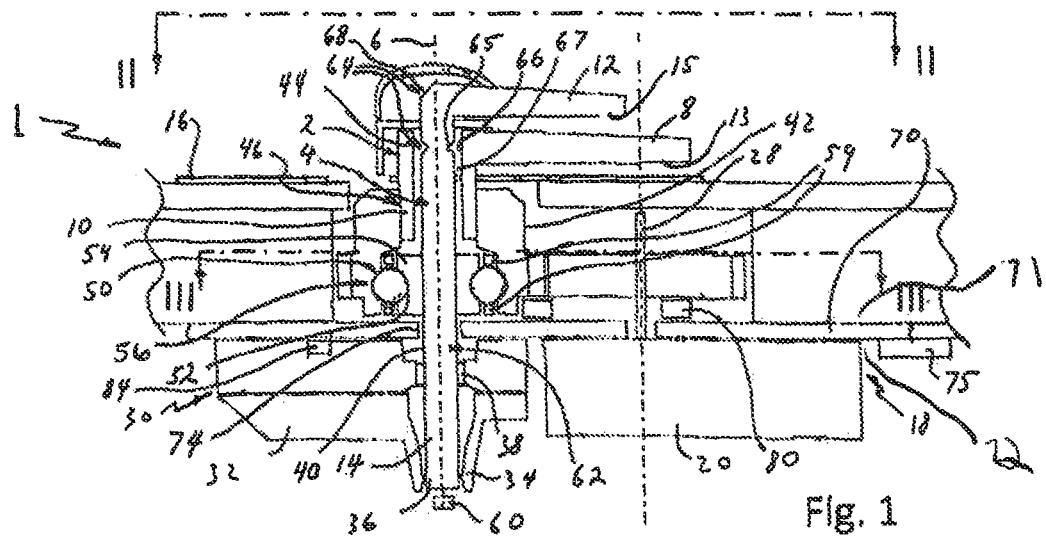
FIG. 1 is a cross-sectional schematic view of the components in a pointer display according to an example embodiment.
FIG. 2 is a top view of the pointer display, taken along line II-II of FIG. 1.
FIG. 3 is a cross-sectional view along the line III-III of FIG. 1.

FIGS. 1 to 3 illustrate an example of pointer display 1 for providing a first visible indication and a second visible indication to a viewer of the pointer display. The pointer display has a first pointer element or member 2 and a second pointer element or member 4. Each pointer element 2, 4 is rotatable about its own axis and these axes are near to a common axis 6 and are therefore essentially coincident with each other. The common rotation axes of the pointer elements 2, 4 are therefore represented by a single dashed line 6 in FIG. 1.

The first pointer element 2 comprises a first pointer arm 8 and a first stem 10, and the second pointer element comprises second pointer arm 12 and a second stem 14 which. Both stems extend in a direction parallel with the common rotational axis 6 of the pointer elements 2, 4. Both pointer arms 8, 12 are formed in a translucent material and extend in a radial direction away from the common axis 6 and away from their respective stems or shafts 10, 14 to provide separate visible indications with respect to a display area 16 on which may be printed scales, indicia or other visible information.

Although not shown in the drawings, this visible indication may be accomplished with a technique which will be known to those skilled in the art, for example by including a fluorescent dye into a translucent material forming the pointer arms 8, 12, or by applying a paint to a rear surface of the 13, 15 of the arms.

The pointer display 1 comprises a first drive mechanism 18 for driving the rotation of the first pointer 8, the first drive mechanism comprising a first motor 20, which is accomplished by a stepper motor, and a gear train 22. The gear train 22 links the first motor 20 to the first shaft 10 to drive the rotation of the first pointer element 2. The gear train 22 includes an input gear 24 (also called a drive gear) and an output gear 26 (also called a driven gear). The output gear 26 is connected to the first shaft 10 and the input gear 24 is directly driven by a rotatable output shaft 28 from the first motor 20. Power is therefore provided from the first motor 20 to the output gear 26 via the input gear 24 in order to rotate the first shaft about the common axis 6.

The pointer display 1 also includes a second drive mechanism 30 for driving the rotation of the second pointer element 14, the second drive mechanism 30 including a second motor 32 which is preferably a stepper motor. The second motor 32 is linked to the second shaft 14 to drive the rotation of the second pointer element 4.

In this example, the second shaft 14 is cylindrical along substantially all of its length. The second motor 32 is a shaftless motor having a circular slip bearing 34 for supporting a cylindrical end 36 of the second shaft 14. The second motor also has a rotatable drive collar 38 connected around a cylindrical outer surface 40 of the second shaft. The bearing 34 and collar 38 of the second motor are both concentric with the common axis 6 of the pointer shafts.

In this example, the gear train 22 for driving the first shaft 10 comprises toothed wheels 24, 26 which lie in a common plane. Other types of gear train may be employed, for example worm gears, but the toothed wheel arrangement has a number of benefits in this pointer display, and not just in terms of lower cost. In particular, the toothed wheels have a low height profile relative to a plane passing through the engaged gears. This helps to minimise the height of the first drive mechanism 18 in a direction parallel with the common rotational axis 6.

Secondly, the pair toothed wheels 24, 26 can readily be formed with any suitable gear ratio and with any suitable radii. The radii of the toothed wheels permits the first drive motor 20 to be laterally offset with respect to the common axis 6 and also with respect to the second drive motor 32. This arrangement of the two motors also helps to reduce the height of the pointer display device 1 in the direction of the common axis 6.

In this example, the output gear 26 is connected to the first shaft 10 by means of a collar 42 that extends axially away from the plane of the gear train 22 in the direction of the pointer arms 8, 12. The output gear 26 is of unitary or one-piece construction with the collar 42. In this example, the collar and gears are all made in a moulded, plastics material.

As can be seen from the cross-section of FIG. 1, the collar 42 is effectively an extension of the first stem 10. The first stem 10 therefore has an upper portion 44 which is integral with the first pointer arm. The collar 42 then forms a lower portion of the first stem 10, the upper and lower first stem portions overlap in an intermediate portion 46 of the first stem 10. In this way, the collar 42 and stem upper portion 44 are joined together, for example with an adhesive or by a friction fit.

Below the intermediate portion of the first stem, the first stem upper portion ends and the inner radius of the collar 42 increases. These features provide additional space between the collar 42 and cylindrical second stem for a bearing 50, which in this example is a ball bearing. The bearing includes an inner race 52 which is provided by an inner collar 54 joined to the outer surface 40 of the second stem 14. An outer race 56 of the bearing is provided by the collar 42 on a radially inwards surface. A plurality of steel balls are held between the races 52, 56. As the speed of rotation of the bearing is relatively low, lubricant is not essential in the bearing, although the top and bottom ends of the bearing are closed with protective annular sealing members 59, shown schematically in the FIG. 1.

In this arrangement, the output gear 26 is supported by the bearing 50 on the collar portion 42 of the second stem 14.

Also shown is an optical system for illuminating the pointer arms to a viewer. This optical system comprises: a light source 60, in this example a single white light emitting diode (LED) package; a light pipe 62 for conveying light from the LED, the light pipe being the translucent material of the second stem 14; and a light splitter 64 for directing some of the light from the light pipe 62 laterally into both pointer arms 8, 12.

The LED light source 60 is shown schematically in FIG. 1. In practice, this may be mounted on a circuit board and be connected to suitable drive and control circuitry so that light is provided to the pointer arms, for example when vehicle sidelights or headlamps have been activated.

The light splitter 64 comprises a notch 65 which extends fully around the circumference of the second stem outer surface 40. The notch may be V-shaped. In use, the notch disrupts total internal reflection at this point in the light pipe 62 so that some light can escape laterally, and some of this light will then be captured by a radially inwards face 66 of the second pointer arm 12 and then conveyed along then length of the translucent material of the first pointer arm in order to illuminate the first pointer to a user of the display.

The radially inwards face 66 of the second pointer arm 12 is separated from the second stem outer surface 40 by a gap 67, which allows both stems to rotate without rubbing against one another.

Some of the light not deflected by the notch 65 continues along the length of the second stem until this impinges on another part of the splitter 64, which therefore also comprises a surface 68 in the upper end of the second stem 14. The surface 68 is set at an angle to the common axis 6, for example a 45° angle, so that this reflects light laterally into the first pointer arm 12 in order to illuminate the first pointer to a user of the display.

The light pipe 62 is therefore configured to receive light from the light source 60 and to convey this light to the light splitter 64. The light pipe is provided by the second shaft 14 and the light splitter is configured to divide light between the first and second pointer arms such that both arms are illuminated by light.

The pointer display 1 also comprises a printed circuit board (PCB) 70. The PCB 70 has opposite first and second sides 71, 72 and comprises a plurality of electrical traces (not shown) for conveying electrical signals and/or electrical power to the first and second motors 20, 32. The first side 71 of the PCB 70 is furthest from the pointer arms 8, 12 and viewer of the display, and the second side 72 is nearest the pointer arms 8, 12 and viewer of the display.

The PCB 70 may conveniently be used to accommodate associated electronic components, in particular a processor 75 for controlling the operation of the first motor 20 and second motor 32.

Both the motors are mounted on the first side 71 of the PCB 70. The gear train 22 is provided on the second side 72 of the printed circuit board. The first shaft and the second shaft both extend in a direction away from the second side of the printed circuit boards towards, respectively, the first pointer arm and the second pointer arm.

The cylindrical main body (or the second shaft/stem) 14 of the second pointer element 4 extends through an aperture 74 in the PCB 70 to engage directly with the rotational output of the second motor 32.

The first drive mechanism 18 for driving the rotation of the first pointer 8 preferably comprises at least one sensor 80 in proximity with a gear of the gear train 22 for measuring the degree of rotation provided by the first drive mechanism 18. The sensor may be any suitable type of sensor, for example an infra-red or physical detector.

In this example, the sensor 80 is provided on the second side 72 of the PCB and is positioned to sense the passage of gear teeth 82. Alternatively, a feature in the gear wheel may be specifically provided for this purpose, such as one or more holes, notches, ribs or printed or painted areas that can be detected using the detector.

An output from the sensor 80 is provided to the processor 75 which determines the rotational position of the first pointer using the output received from the sensor.

The second drive mechanism 30 also preferably comprises at least one sensor 84, which may be any suitable type of sensor, for example an infra-red or physical detector. In this example there is one such second sensor 84, which is integrated with the second motor and shown schematically in FIG. 1. The processor 75 is arranged to receive an output from the second sensor 84 in order to determine the rotational position of the second pointer using the received output.

Either of the sensors may comprise a dual detector and function as a quadrature sensor, so that the processor can determine the direction of rotation independently of the applied input to the drive motors.

One advantage of is that this allows the use of many different types of conventional motor, which can have different characteristics and features depending of the type of pointer display and the required degree of rotation, which may include any range of angles up to 360° operation.

The gear train 22 from the first motor is of relatively inexpensive construction, consisting of two gears, one of which 20 is solid and the other one of which 26 has a bearing 50 integrated within it. These gears can be customised to suit the type of motors being used.

Alignment and concentricity about the common axis 6 is assured by using the output shaft for one motor as the reference for the gear driven by the other motor. Gear to gear centre distance is controlled by the motor location on a printed circuit board or other similar part which allows very good tolerances to be achieved.

Illumination can be by using an LED illuminated shaft which passes through a shaftless motor, or by shining light into a pointer shaft via another light guide.

The dual pointer display 1 can be any type of display including, for example, a clock, stopwatch or an automotive vehicle meter.

The aspects disclosed herein provide a convenient and economical arrangement in a dual rotatable pointer display for independently rotating two illuminated pointer arms sharing a common light source.

We claim:
1. A pointer display with a first visible indication and a second visible indication, comprising:
   a first pointer element, the first pointer element being rotatable around a first axis and comprising a first pointer arm and a first stem, the first stem extending in a first axis and the first pointer arm extending away from the first stem to facilitate the first visible indication;

a second pointer element, the second pointer element being rotatable around a second axis and comprising a second pointer arm and a second stem, the second stem extending the second axis and the second pointer arm extending away from the second stem to facilitate the second visible indication, and the first axis and the second axis being coincident with each other wherein the first pointer element and the second pointer element rotate around a common axis;

a first drive mechanism to drive a rotation of the first pointer element, the first drive mechanism comprising a first motor and a gear train, the gear train linking the first motor to the first stem to drive the rotation of the first pointer element, and the gear train comprising an input gear and an output gear, the output gear being connected to the first stem and the input gear providing power from the first motor to the output gear in order to rotate said connected output gear and the first stem around the first axis;

a second drive mechanism to drive a rotation of the second pointer element, the second drive mechanism comprising a second motor, the second motor being linked to the second stem to drive the rotation of the second pointer element;

an optical system to illuminate the first pointer arm and second pointer arm, the optical system comprising a light source, a light pipe and a light splitter, the light pipe being configured to receive light from said light source and to convey said light to the light splitter, the light pipe being provided by the second stem and the light splitter being configured to divide said light between the first pointer element and the second pointer element such that both the first pointer arm and the second pointer arm are illuminated by said light;

wherein the output gear is supported by a bearing on the second stem, the output gear and the first stem being rotationally mounted on the second stem by the bearing.

2. A pointer display as claimed in claim 1, in which the bearing is a rolling-element bearing comprising a plurality of round elements between two bearing rings.

3. A pointer display as claimed in claim 2, in which the bearing is a rolling-element bearing is a ball bearing comprising a plurality of balls between an inner race and an outer race.

4. A pointer display as claimed in claim 3, in which the inner race is stationary relative to the second stem and the outer race rotates with said rotation of said connected output gear and first stem.

5. A pointer display as claimed in claim 3, in which the second stem comprises a cylindrical main body, said cylindrical main body providing said light pipe and the inner race being affixed to an outer cylindrical surface of said light pipe.

6. A pointer display as claimed in claim 1, in which the first motor is a stepper motor.

7. A pointer display as claimed in claim 1, in which the second motor is a stepper motor.

8. A pointer display as claimed in claim 1, in which the bearing comprises a substantially cylindrical collar affixed to said cylindrical main body such that the bearing is supported on the cylindrical main body of the second stem by said collar and such that a gap separates said cylindrical main body and the first stem, wherein the first stem and second stem rotate without rubbing against one another.

* * * * *